(12) United States Patent
Kuniavsky et al.

(10) Patent No.: US 9,852,317 B2
(45) Date of Patent: Dec. 26, 2017

(54) PRINTABLE, WRITEABLE ARTICLE FOR TRACKING COUNTERFEIT AND DIVERTED PRODUCTS

(71) Applicant: Palo Alto Research Center Incorporated, Palo Alto, CA (US)

(72) Inventors: Michael Kuniavsky, San Francisco, CA (US); Paula M. Te, San Francisco, CA (US); Shantanu Rane, Menlo Park, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 14/954,369

(22) Filed: Nov. 30, 2015

(65) Prior Publication Data

US 2017/0032237 A1 Feb. 2, 2017

Related U.S. Application Data

(60) Provisional application No. 62/189,595, filed on Jul. 29, 2015.

(51) Int. Cl.
| | |
|---|---|
| *G06F 19/00* | (2011.01) |
| *G06Q 90/00* | (2006.01) |
| *G06Q 30/00* | (2012.01) |
| *G06K 7/10* | (2006.01) |
| *G06K 19/077* | (2006.01) |
| *G06K 19/06* | (2006.01) |
| *G06K 19/07* | (2006.01) |

(52) U.S. Cl.
CPC ..... *G06K 7/10019* (2013.01); *G06K 7/10009* (2013.01); *G06K 19/06028* (2013.01); *G06K 19/06037* (2013.01); *G06K 19/0723* (2013.01); *G06K 19/0776* (2013.01); *G06K 19/07758* (2013.01)

(58) Field of Classification Search
CPC ......... G06F 19/00; G06F 17/00; G06Q 30/00; G06Q 90/00; G06K 19/00
USPC ................................ 235/385, 375, 487, 382
See application file for complete search history.

(56) References Cited

U.S. PATENT DOCUMENTS

| | | | |
|---|---|---|---|
| 6,442,276 | B1 | 8/2002 | Doljack |
| 6,681,214 | B1 | 1/2004 | Doljack |
| 6,820,201 | B1 | 11/2004 | Lincoln |
| 6,996,543 | B1 | 2/2006 | Coppersmith et al. |
| 7,212,637 | B2 | 5/2007 | Salisbury |

(Continued)

FOREIGN PATENT DOCUMENTS

EP     2 709 035 A2    3/2014

OTHER PUBLICATIONS

Ramsbrock, Daniel, et al., "Magnetic Swipe Card System Security," University of Maryland, found at: https://www.cs.umd.edu/~jkatz/THESES/ramsbrock.pdf.

(Continued)

*Primary Examiner* — Edwyn Labaze
(74) *Attorney, Agent, or Firm* — Marger Johnson

(57) ABSTRACT

An article includes a writeable memory printed on a substrate, a characteristic of the article usable to derive a seed value, and a value stored in the memory, wherein the value is generated by a hashing process using the seed value. The writeable memory may also be a readable memory, and may store more than one value.

9 Claims, 4 Drawing Sheets

(56) References Cited

U.S. PATENT DOCUMENTS

| | | |
|---|---|---|
| 7,309,011 B2 | 12/2007 | He |
| 7,688,980 B2 | 3/2010 | Kean et al. |
| 8,281,983 B2 | 10/2012 | Shuman et al. |
| 8,620,821 B1 | 12/2013 | Goldberg et al. |
| 8,917,159 B2 * | 12/2014 | McAllister .......... G06Q 10/087 340/10.51 |
| 9,239,941 B1 * | 1/2016 | Diorio ................ G06K 19/0723 |
| 2002/0170966 A1 | 11/2002 | Hannigan et al. |
| 2004/0066278 A1 | 4/2004 | Hughes et al. |
| 2005/0010788 A1 * | 1/2005 | Craft .................... G06F 21/123 713/187 |
| 2005/0049979 A1 | 3/2005 | Collins et al. |
| 2005/0234778 A1 * | 10/2005 | Sperduti ............... G06Q 20/20 705/22 |
| 2007/0036470 A1 * | 2/2007 | Piersol ............... G06K 9/00577 382/306 |
| 2008/0297354 A1 * | 12/2008 | Foley .................. H04L 9/3271 340/572.4 |
| 2009/0294521 A1 * | 12/2009 | de la Huerga .......... A61J 1/035 235/375 |
| 2009/0323928 A1 * | 12/2009 | Kerschbaum .......... G06Q 10/06 380/28 |
| 2013/0124855 A1 | 5/2013 | Varadarajan |
| 2013/0285795 A1 * | 10/2013 | Virtanen ................ G01K 1/024 340/10.1 |
| 2013/0311519 A1 * | 11/2013 | Deking ............. G06F 17/30879 707/803 |
| 2014/0074746 A1 | 3/2014 | Wang |
| 2014/0076975 A1 | 3/2014 | Bellmyer et al. |
| 2015/0032569 A1 * | 1/2015 | Stromberg ......... G06K 7/10009 705/26.35 |
| 2016/0087792 A1 * | 3/2016 | Smith .................. H04L 9/0869 380/278 |

OTHER PUBLICATIONS

Alfred Menezes et al. "Handbook of Applied Cryptography," Jan. 1, 1997, CRC Press, Boca Raton, XP055314538, p. 173.

European Search Report, EP16180871.9, dated Nov. 9, 2016, 6 pages.

\* cited by examiner

PRINTABLE, WRITEABLE ARTICLE FOR TRACKING COUNTERFEIT AND DIVERTED PRODUCTS

RELATED APPLICATIONS

This application is a continuation of, and claims priority to, U.S. Provisional Application No. 62/198,595, filed Jul. 29, 2015.

This application is related to the following applications filed concurrently herewith, which are incorporated by reference herein in their entirety:

U.S. patent application Ser. No. 14/954,432, filed Nov. 30, 2015.

U.S. patent application Ser. No. 14/954,474, filed Nov. 30, 2015.

Ser. No. 14/954,519, filed Nov. 30, 2015.

TECHNICAL FIELD

This disclosure relates to tracking objects having a printable memory tag, more particularly to tracking counterfeit or diverted products by reading and writing to a printable memory tag.

BACKGROUND

Identification of counterfeit and/or diverted products has several issues. Identification of counterfeit items requires tracking and logging of the objects being tracked. The objects need an indicia, referred to here as a tag, the uniquely identifies the object. Object may include packages that include multiple items, as well as the individual items in the packages. The individual items may consist of almost anything, from pharmaceuticals such as bottles or other types of containers, clothing such as designer clothes and shoes, documents like passports, etc. The tags typically consist of a permanent number or other identifier that cannot be changed. These may be printed on the article or possibly even entered on a radio-frequency ID tag (RFID) that cannot be changed or corrupted.

Once tagged, the object's identifier is entered into a database that is accessible by the shipper and receiver. Typically, this consists of a networked, centralized database. Once shipped from the initiating facility, where the tagging occurred, the recipient will need to read the tag and check it against the database. This allows the recipient to verify the authenticity of validity of the tagged item.

If an item shows up as being counterfeit, the recipient has to update the database to provide the information on the counterfeit item. This transaction typically occurs on paper or through an RFID reader at the time of the identification. If it were not done then, the information may be lost or inaccurate with regard to the time and date.

In some instances, the counterfeit item may not be detected, if the tag was replicated with enough accuracy. The recipient may not know that the object tag undergoing verification is attached to a cheaper, lower quality version of the original object that may have been substituted for the original during a theft of diversion of products. Similarly, the recipient has no way of knowing if the product, even if authenticated, was diverted or somehow arrived at the recipient without having undergone inspection or tally at customs houses or tax authorities.

SUMMARY

An embodiment is an article that includes a writeable memory printed on a substrate, a characteristic of the article usable to derive a seed value, and a value stored in the memory, wherein the value is generated by a hashing process using the seed value. The writeable memory may also be a readable memory, and may store more than one value.

DETAILED DESCRIPTION OF THE EMBODIMENTS

Figure 1:
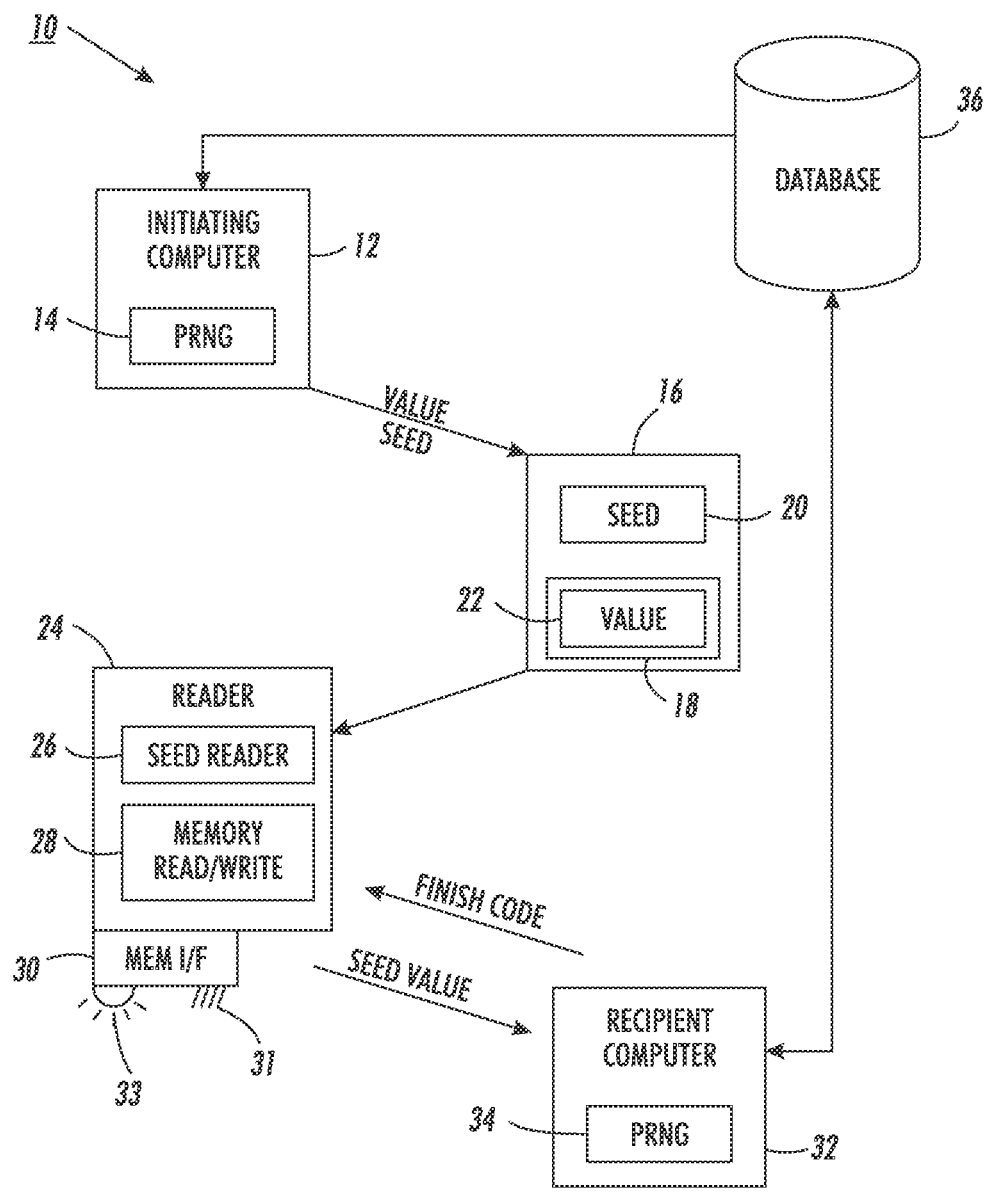
FIG. 1 shows an embodiment of a tracking and authentication system.

FIG. 1 shows an embodiment of a tracking and authentication system. The system has several components, including a printable, readable/writeable non-volatile memory. An example of such printable memory is available from Thin Film Electronics, ASA. The ability to print non-volatile memory onto various objects opens up many possibilities for 'smart' tags beyond radio-frequency ID (RFID) tags. RFID tags, or even memory tags, are typically manufactured, packaged and then attached to objects. Printable memory allows the tags to be printed directly on the objects, such as container seals, including pharmaceutical containers, documents, verification stamps, tax stamps, etc.

Memory tags have the capability to be rewritten, which can raise several risks, as counterfeiters can rewrite the tags to change the information, making it harder to track and identify legitimate objects. For that reason, manufacturers such as Thin Film Electronics typically write codes to be used in near-field communication (NFC) tags into the memories at manufacture in such a manner so they cannot be electrically modified. Memory labels, such as those manufactured by Thin Film Electronics ASA, are printed as well, but generally not used as security tags because of the ability to write to the memory labels.

The system of FIG. 1 provides not only a solution to the issues of using the writeable memory, it actually turns the ability to write to the memory into an advantage using an encryption system to generate the values to be written into the memory. In the system 10, an initiating computer 12 has the ability to run a unique, cryptographically secure, pseudo-random number generator (PRNG) 14. The PRNG may take many forms, but will have the characteristic of generating a known sequence of numbers when provided with a 'seed' value. These values are relatively simple to generate, but difficult to guess without application of significant computing power over a relatively long period of time. A counterfeiter would not have the ability to decipher the generator to provide the correct values in the amount of time in which it would be possible to divert or replace the legitimate objects.

The initiating computer 12 either reads or generates the seed value 20, which will be referred to here as acquiring the seed to include both options. The seed may be generated from variable physical characteristics of the object, such as its precise physical dimension in the case of a fruit, some physical characteristic of the object obtainable by scanning it, or read from an explicit encoding, such as a QR (quick response) code, a printed 2D bar code, etc. The initiating computer may print the QR code or barcode onto the object or label. Generally, the seed value will be outside the memory, although it is possible the seed value could be stored in the memory as well. The seed value initiates the PRNG to produce a first value 22 in the sequence of values, which is then written into the printed memory 18. For purposes of this discussion, the seed value is the value that initiates the PRNG process, which in turn results in the value that is written into the memory. The value or values written into the memory will be referred to as the original values, and the values generated by other entities in the system to be checked against the original values will be referred to as the authentication value.

As shown in FIG. 1, the printed memory 18 is attached to an object 16. In some instances, the printed memories are printed on adhesive labels that are then attached to items. Depending upon capabilities of the printers, not shown, the memory 18 may be printed directly onto the object itself, rather than a label that is then attached. No limitation to any particular application of the printed memory to the object is intended and none should be implied.

The object with its associated printed memory is then shipped to at least a first recipient. The first recipient's computer 32 will also have the PRNG 34 that was used by the initiating computer. The PRNG is initialized using a seed, which is always present, and some optional additional parameters. In some embodiments, the seed is distributed in a secure manner, accessible and only usable by authorized users on authenticated computers. In other embodiments, the seed may be read from a QR code or a barcode, or be publicly available, while one or more additional parameters are distributed in a secure manner, accessible and only usable by authorized users on authenticated computers. The first recipient will first obtain the seed value in whatever manner was predetermined by the initiating computer, such as reading the QR or barcode, scanning the object to determine the physical characteristic that can be turned into the seed value, etc. Once the seed value is determined, the recipient computer will initiate the PRNG and generate an authentication value to be compared to the value in the memory. This will be discussed in more detail later.

The recipient's computer 32 may have as part of it a reader device 24 that accesses the printed memory 18 to retrieve the original value to which the authentication value will be compared. The reader may also be a separate device. Similarly the seed reader 26 may be separate from the memory reader 24, such as the QR code or barcode reader, optical scanner, etc. These could also both be part of a smart phone. The reader 24 has a memory interface 30 of some kind.

The memory interface 30 may include one or both of a probe type reader, such as a contact strip, or a set of spring loaded pins, that connect to the memory contacts on the printed memory 18 that allows the attached reader to both read the data in the memory and rewrite the memory as needed. There may be a memory reader/controller 28 in the device that converts the signals read from the memory into the original code. The memories are typically readable using near-field communications (NFC), but not necessarily writeable to it. Writing is typically done by physical contact with the contacts, discussed above. However, the ability to use non-contact memory writing is a possibility.

Using the one or more readers, the computer 32 obtains the seed value and the original value. This will allow the computer to determine whether or not the object 16 is authentic. If the reader and/or the computer does not have access to the centralized database 36 at that time, it will have the capability of recording the date and time of the reading, as well as the authentic or counterfeit status of the object, for later upload to the database.

This system frees the recipient from having to upload the value read from memory to determine if the object is authentic or counterfeit. The determination can be made locally and the reading device and/or computer can connect to the database at some other time to update the centralized database. In addition, if the object is either counterfeit or has arrived at its final destination, the computer has the ability to write some sort of finish code to the memory 18. The finish code could be a predetermined code that indicates the counterfeit nature of the object, or that it no longer needs to be authenticated. The finish code may also include setting the memory to zero, meaning that there is no data in the memory.

Figure 2:
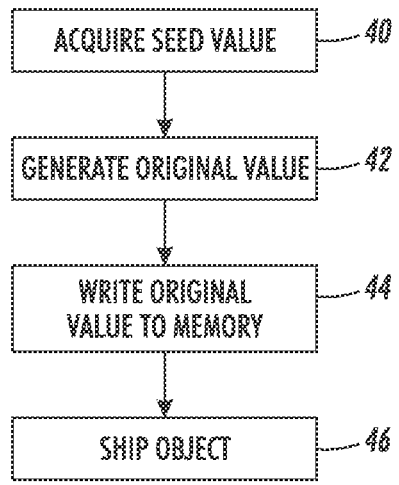
FIG. 2 shows a flowchart of an embodiment of a method of tagging an object with a printable memory.

The discussion now turns to the various tasks and processes used by the different users of this system. In FIG. 2, the user consists of the original shipper or generator of a document, referred to here as the initiator. The initiator acquires the seed at 40 in whatever manner has been predetermined across the system. As discussed above, the seed will typically be some characteristic of the object, a barcode, a QR code, etc., obtainable without having to read the memory. The seed value then feeds into the PRNG to produce a first of the original values at 42. This value is then written into the memory at 44. The initiator then ships or otherwise sends the object at 46.

Figure 3:
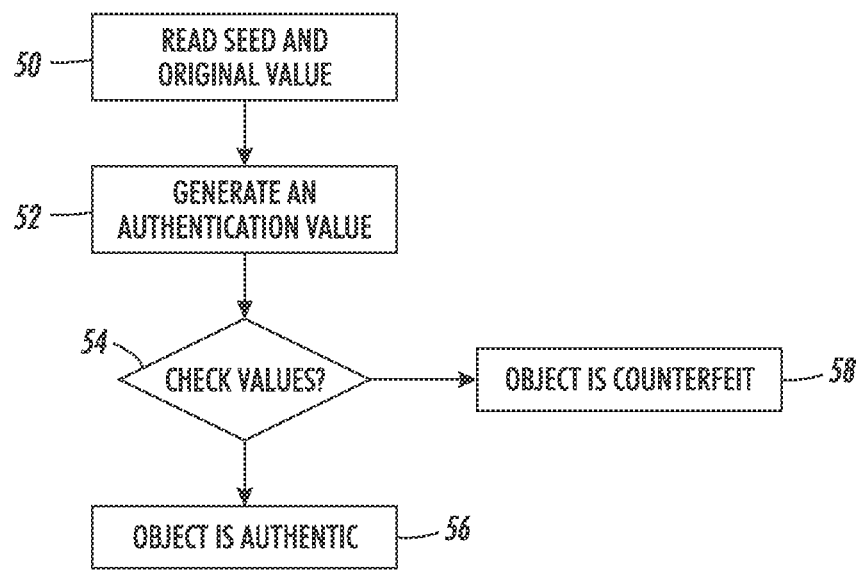
FIG. 3 shows a flowchart of an embodiment of a method of authenticating a memory-tagged object at a first recipient.

FIG. 3 shows one embodiment of a method of authenticating the object at a first recipient. The first recipient may vary from other recipients as will be discussed with regard to FIG. 6. However, there may not necessarily be true. The first recipient and subsequent recipients may operate in a same fashion, but in this particular embodiment, the first recipient operates slightly differently.

In FIG. 3, the first recipient reads the seed and the original value at 50. As discussed above, 'reading' the seed involves determining a seed value from some characteristic of the object, explicitly such as in the form of a QR code or a barcode, or implicitly such as the dimensions, patterns, etc., of the object itself. Reading the original value involves accessing the memory and reading the value that was written by the initiator.

At 52, the recipient's computer system then runs the same PRNG using the seed value to generate an authentication value. At 54, the authentication value is checked against the original value. If the values match, the recipient knows that the object is authentic at 56 and, meaning that it is not a counterfeit, and can be processed according to normal processes of the recipient, such as stocking a warehouse, shipping it onwards in the supply chain, etc. If the object is counterfeit at 58, the at least one of the time, date and location is stored in the reader. As mentioned above the memory on the object may be rewritten to store a code that identifies the object as counterfeit, or could include the date, time and/or location.

Figure 4:
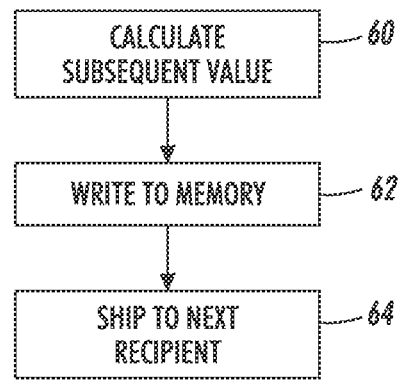
FIG. 4 shows a flowchart of an embodiment of a method of updating a tag at a first recipient.
Figure 5:
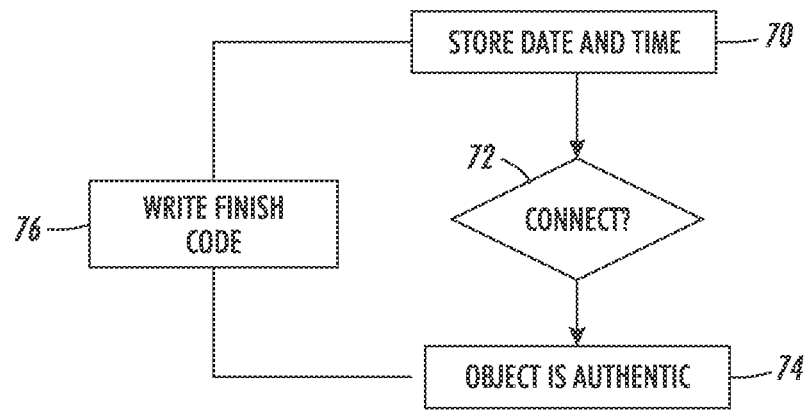
FIG. 5 shows a flowchart of an embodiment of a method of reporting a counterfeit or diverted object.

If the object is found to be authentic at 54, the recipient may then initiate a process as shown in FIG. 4. In this situation, the recipient may be the first recipient or subsequent recipients that intend to send the object further onwards. As stated above, if an article is counterfeit, or even if it is authentic but will go no further, the system can write a finish code or blank the memory. The recipient will calculate the subsequent value using the PRNG at 60 and then write the new value to the memory at 62. The new value will still be referred to as the original value.

As stated above, the PRNG may produce a sequence of known, reproducible numbers in a list. The value written by the recipient may or may not be the next number down the list. There may be a known step difference used to determine which value in the list is the actual 'next' value. For example, if one were to assume that the seed value, which is the same for every user, has a first digit of the number '3,' then the next value would be three values down the list from the first value. The next value in the next step for the object would then be three more values down the list of known values. Whatever the next value, the recipient writes it into the printable memory at 62 and ships the object to the next recipient at 64.

Figure 6:
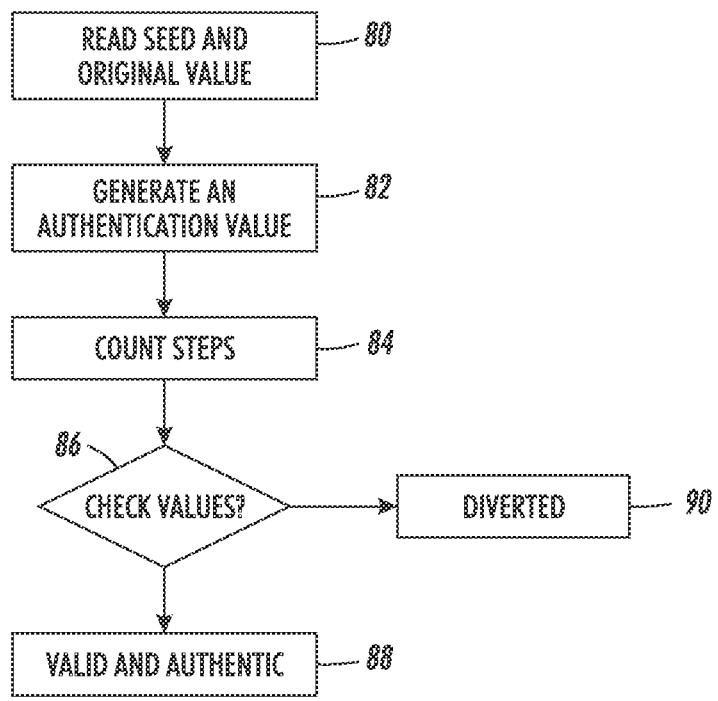
FIG. 6 shows a flowchart of an embodiment of a method of authenticating a memory-tagged object at a subsequent recipient.

Returning to FIG. 3, the recipient may execute a process to report the counterfeit object after the determination of counterfeit at 58. FIG. 6 shows one embodiment of this process. At 70, at least one of the date and time are stored, either in the reader or the recipient's computer. Other information may also be stored, such as the SKU or other stock number, the location, an identifier of the object, etc. This information is stored if the reader or computer, which may be the same thing, is not connected to a network through which it can reach the centralized database. When a connection is present at 72, the information is uploaded at 74. In the meantime, or at any point in this process, the system may write a finish code into the memory at 76, but that is optional.

As discussed above, the process of authenticating an object may differ for recipients after the first recipient. Another option is to have the first recipient go through the same process of tracking the step number, even though it may be zero for the first recipient, if that makes the process more universal for all recipients. FIG. 6 shows this process.

At 80, the next recipient receives the object and reads the seed and value in a similar fashion to the first recipient. It may differ slightly in that the new recipient's computer may need to make a note of whatever the step indicator is. The recipient generates an authentication value at 82, which in this case will involve generating a list of values. The computer then identifies the step count and counts to the appropriate number in the list at 84 before checking for a match at 86. Alternatively, the recipient generates the value first, determines which number it is on the list and then checks the step count. If the step count does not match, this indicates that the product or object was diverted somewhere in the chain at 90. If there is a value match and the step count matches, the object is both authentic and valid, meaning it is at the correct step.

Diversion may be a concern for several reasons. For example, if a document secured in the above matter gets to a location that should be the third station of the chain, but the number that matches indicates that it is at the fourth station, someone could have diverted the document, copied it, and then put it back in the chain. This also will catch accidental double check-ins or other miscues in the supply system.

The object will have one of three states. It is authentic and valid, meaning the value matched and it is at the right step or station in the chain. It is authentic but invalid, meaning there was a value match, but it is at the wrong step. Finally, it can be inauthentic/counterfeit, which means there was no match so it will not have a step count.

In the above embodiments, the function, such as a PRNG takes a seed value and outputs the list of seemingly random numbers. In another embodiment, the function takes two inputs, a seed value and another number that represents some useful information about the device, document, or object to which the writeable memory is attached. The second number may consist of an encoded representation of some secondary information such as an area code of the manufacturer, date of manufacture or expiration, name of the inspecting agency, web address of a database server that contains more information about the product, or any other information the original sender believes to be useful to the supply chain. At the recipient, the recipient's computer decodes the secondary value and can use it as another verification.

In another embodiment, the bits in the values, whether the seed values or secondary values, may be encoded in such a manner that the bits in the value seem statistically random. However, the recipients who have the correct function, the seed value and, if used, the secondary value, can determine that the bits are not random.

In this manner, one can use printable, writeable memory to store values for object authentication. The values do not have to be locked at the manufacturers' sites, nor are they easily guessable, but easy to generate. The system provides an inexpensive, relatively easy to implement, secure system for object authentication and validation.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the above embodiments and below claims.

What is claimed is:

1. An article, comprising:
    a writeable memory printed on a substrate attached to an object;
    a characteristic of the object outside the memory, usable to derive a seed value;
    a value stored in the memory, wherein the value is generated by a hashing process using the seed value, the value being an authentication value; and
    a step number stored in the memory, wherein the step number corresponds to the value stored in the memory.

2. The article of claim 1, wherein the substrate comprises at least one of paper, a sticker, a bottle, a box, and a document.

3. The article of claim 1, wherein the writeable memory is also readable memory.

4. The article of claim 1, wherein the characteristic of the object is an explicit characteristic.

5. The article of claim 4, wherein the explicit characteristic is one of a bar code or a QR code.

6. The article of claim 1, wherein the characteristic of the object is an implicit characteristic.

7. The article of claim 6, wherein the implicit characteristic is one of at least one dimension of the article or a pattern on the article.

8. The article of claim 1, further comprising at least one conductive contact electrically connected to the memory.

9. The article of claim 1, further comprising a secondary value stored in the memory.

* * * * *